United States Patent
Bean

(10) Patent No.: US 7,165,580 B2
(45) Date of Patent: Jan. 23, 2007

(54) CABLE PROJECTILE CATCHER

(76) Inventor: Arlen K. Bean, 1840 Manzanita La., Reno, NV (US) 89509

( * ) Notice: Subject to any disclaimer, the term of this patent is extended or adjusted under 35 U.S.C. 154(b) by 122 days.

(21) Appl. No.: 11/090,991

(22) Filed: Mar. 28, 2005

(65) Prior Publication Data

US 2006/0213571 A1    Sep. 28, 2006

(51) Int. Cl.
*F16L 9/00*    (2006.01)
(52) U.S. Cl. ............... 138/155; 138/177; 138/178; 138/109; 285/367; 24/285
(58) Field of Classification Search ........... 138/155, 138/177, 178, 109; 24/284, 285; 285/368, 285/410, 197, 367
See application file for complete search history.

(56) References Cited

U.S. PATENT DOCUMENTS

| | | | | |
|---|---|---|---|---|
| 2,311,797 | A | * | 2/1943 | Wright .................. 406/83 |
| 3,736,618 | A | * | 6/1973 | Ramsey ................ 15/309.1 |
| 5,018,768 | A | * | 5/1991 | Palatchy ................ 285/24 |
| 5,542,776 | A | * | 8/1996 | Reynolds ............... 403/389 |
| 6,059,264 | A | | 5/2000 | Kaminski et al. ....... 254/134.4 |
| 6,318,411 | B1 | | 11/2001 | Kology .................. 138/155 |

* cited by examiner

*Primary Examiner*—Patrick F. Brinson

(57) ABSTRACT

A mechanism is provided for attachment to the exit end of a conduit during cable installation through the conduit. The mechanism absorbs the energy from, and captures the projectile and cable assembly exiting from a conduit during cable installation. A clamp is provided to attach the mechanism to the conduit. The clamp can be readily adjusted to fit a variety of conduit sizes.

4 Claims, 2 Drawing Sheets

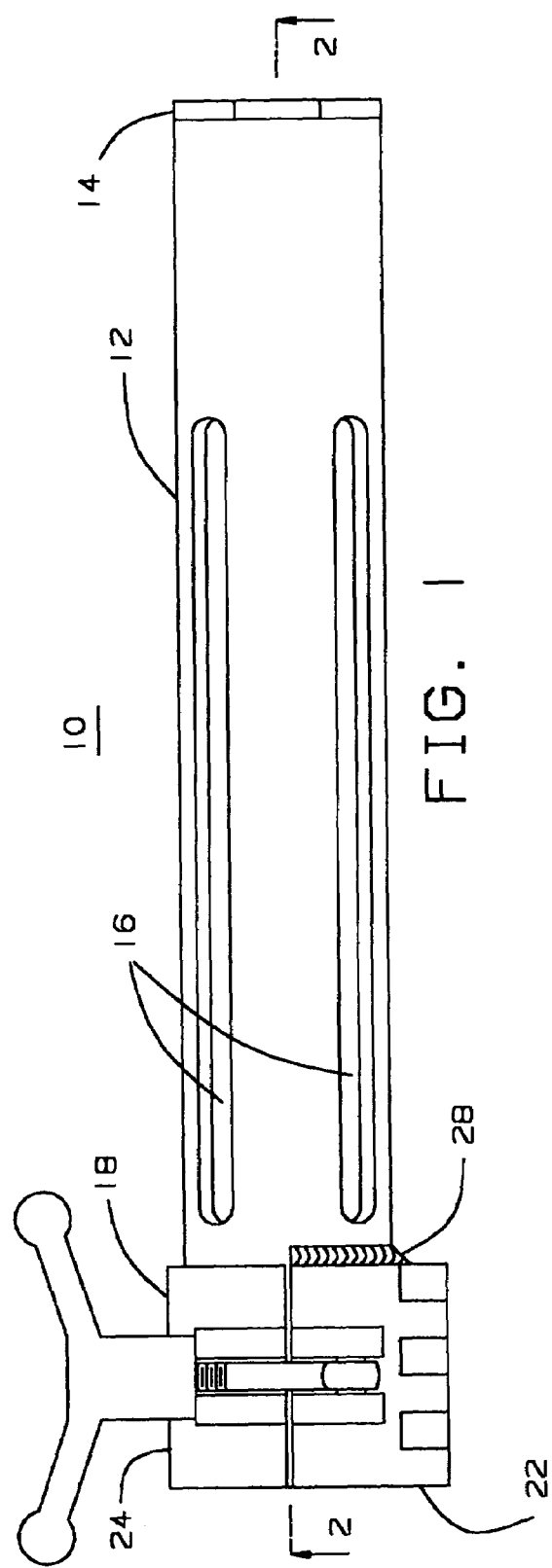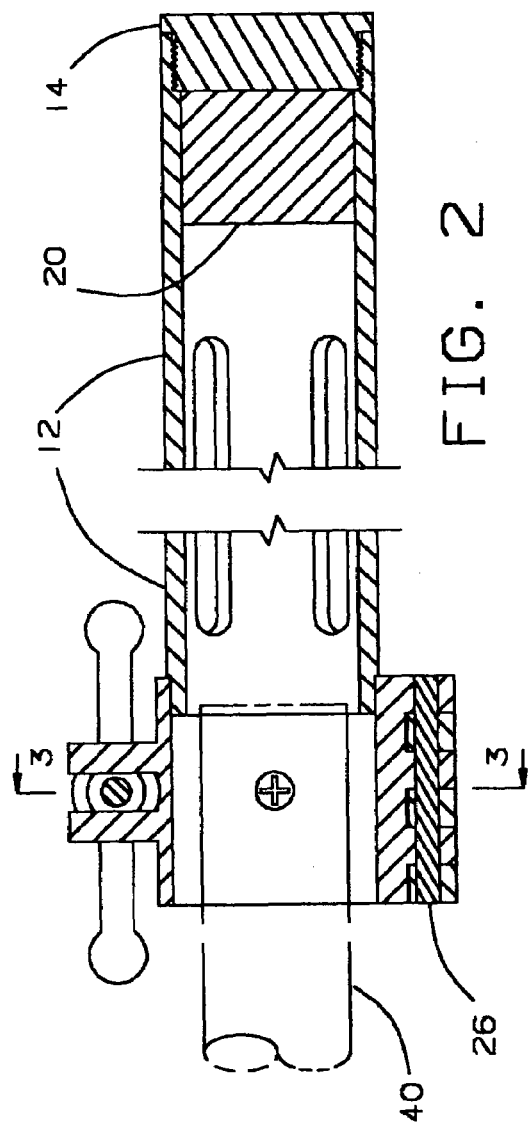

CABLE PROJECTILE CATCHER

FIELD OF THE INVENTION

The present invention relates to an energy-absorbing and projectile capturing system, finding utility when installing fiber-optic cable, or other like cable, in a buried conduit.

BACKGROUND ART

Conduits are often laid underground in covered trenches for long distances. Subsequently, fiber-optic cables or the like are installed in these conduits. During installation the cables are propelled from the open installation end of the conduit over a distance to the open exit end of the length of conduit by a combination of mechanical feeding and air pressurization as illustrated in U.S. Pat. No. 6,059,264 by Kaminski, et al.

The leading end of the cable is affixed with a device that allows free movement of the device through the conduit while also providing a seal between the device and the inside diameter of the conduit. This device is often referred to as a "bird", "parachute", or projectile, or the like. When the open installation end of the conduit is pressurized the pressure differential across the bird propels the bird and the attached cable along the path of the conduit to the open exit end of the conduit. The bird and attached cable may arrive at this exit end at very high velocity. Bodily injury, such as broken limbs, and, property damage, such as firing the projectile and cable over external power lines, have been reported as a result of the violent exit of the bird and cable from the exit end of the conduit.

U.S. Pat. No. 6,318,411 by Kology addresses these problems by using a receiver at the exit end of a conduit to absorb energy and catch the bird. This prior art describes the proofing of a conduit using only a bird, such as, if the bird can be sent through the conduit and arrive at the exit end, the conduit is assumed to be free of obstruction, and hence, ready for cable installation. Kology describes a three-piece tubular structure with a removable cap, which contains an energy absorbing rubber stop. One section of the tubular structure contains attachment threads for joining the removable cap. The second section contains perforations for allowing air escapement that accumulates in front of the moving bird. The third section is a transition tube that adapts the second section diameter to the conduit by reducing the third section diameter so that the inside diameter of the third section equals the inside diameter of the conduit.

The prior art requires a different size receiver for each different size of conduit. Separate conduit clamps or couplers must be provided to attach the receiver to the conduit.

SUMMARY OF THE INVENTION

The present invention utilizes a single tubular construction. One end of the tube is threaded to receive an end cap. The end cap supports a rubber snubber that provides energy dissipation when struck by the bird and cable being installed. Longitudinal slots are provided in the tube to allow air escapement from inside the tube to atmosphere, but are sized to retain the bird and cable within the tube.

The other end of the tube is fitted with a clamping mechanism, including a hinged pair of coupling halves and a locking swivel toggle bolt for attaching the tube to the conduit. The coupling halves are fitted with easily changeable clamping pads that contain gripping means for securing the tube to the conduit. Only one cable catcher is required to handle cable installation in a variety of conduit sizes by simply using the proper size clamping pads to match the conduit size.

Hence, a reliable and inexpensive mechanism provides safety and convenience for dissipating kinetic energy and capturing projectiles and cables during cable installation in multiple sizes of conduit.

BRIEF DESCRIPTION OF THE DRAWINGS

FIG. 1 is an elevation view of the present invention.

FIG. 2 is a cross-section of the invention taken along line 2—2 of FIG. 1.

DETAILED DESCRIPTION OF THE INVENTION

Figure 4:
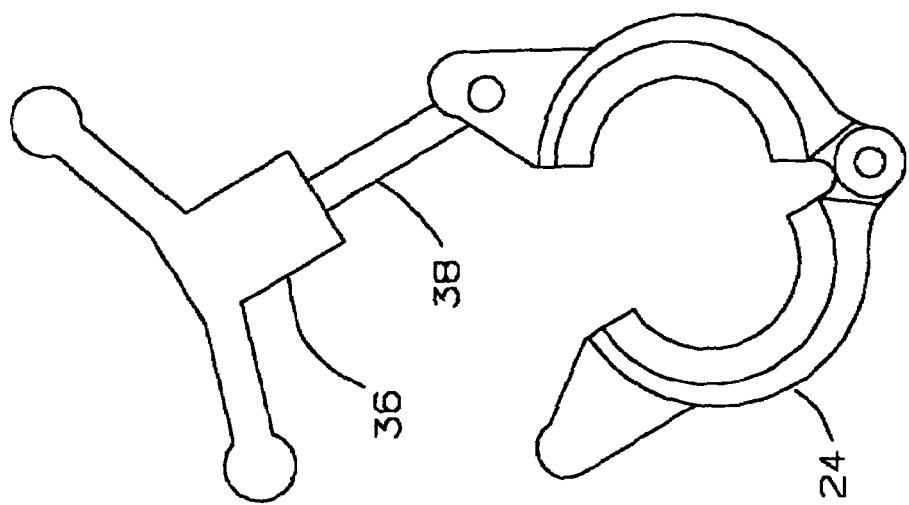
FIG. 4 is an end view of the clamp of the present invention showing unclamping positions of significant parts.

In FIG. 1 a cable projectile catcher 10 is shown. One end of tube 12 is releasably fitted with an end cap 14. Tube 12 is provided with multiple longitudinal slots 16. Attached to the other end of tube 12 is a clamp 18.

In FIG. 2 end cap 14 is shown threaded into tube 12. Snubber 20 is fitted within tube 12 and abuts end cap 14.

Figure 3:
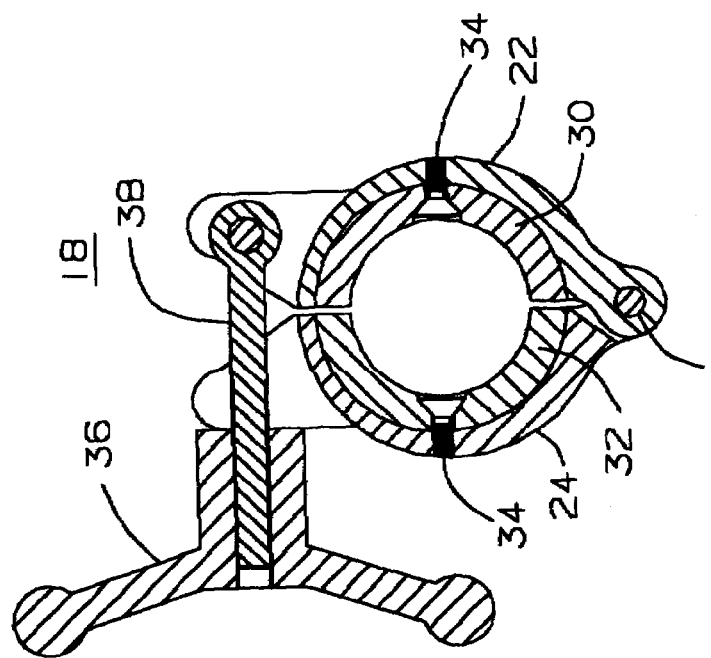
FIG. 3 is a cross-section of the clamp of the present invention taken along line 3—3 of FIG. 2.

FIG. 3 shows clamp 18 with hinged half 22 joined to hinged half 24 by hinge pin 26. Either hinged half 22 or hinged half 24 is welded or otherwise joined to tube 12. For example, hinged half 22 is shown joined to tube 12 by weld 28 in FIG. 1. Clamp pads 30 and 32 are attached to hinged halves 22 and 24 respectively by flush mounting screws 34. The inside surfaces of clamp pads 30 and 32 may be provided with gripping means, such as minute circumferential ribs. Clamp pads 30 and 32 can be properly sized to accommodate the conduit 40 (see FIG. 2) being used in the present installation.

Tightening wing nut 36 onto threaded swivel bolt 38 causes clamp 18 to securely clamp catcher 10 to conduit 40 (see FIG. 2). Conversely, as shown in FIG. 4, if wing nut 36 is loosened, threaded swivel bolt 38 can be swung out of engagement with hinged half 24. Hinged half 24 can then be rotated open to permit removal of catcher 10 from conduit 40.

CONCLUSION

Thus, catcher 10 offers distinct advantages over prior art. Catcher 10 provides a convenient means to provide safe and efficient capture of birds and cable exiting from conduit during installation of the cable. Catcher 10 can accommodate a range of conduit sizes. Catcher 10 is economical to manufacture using a minimal number of parts. Catcher 10 is durable and easy to use.

It will be appreciated that while particular embodiments of the invention have been shown and described, modifications may be made. It is intended in the claims to cover all modifications that come within the true spirit and scope of the invention.

I claim:

1. A catcher for dissipating kinetic energy and trapping a projectile and cable exiting from a conduit, comprising:
    a) a single tube of substantially constant outside diameter and substantially constant inside diameter,
    b) an end cap releasably attached to first end of said tube,
    c) a resilient snubber, and d) an integral clamp attached to second end of said tube for joining said catcher to said conduit, whereby, exit velocity of said projectile and cable is dissipated when said projectile strikes said snubber and whereby, said projectile and cable are captured within said tube.

2. The catcher of claim 1 wherein said single tube contains means to exhaust accumulated air within said tube to atmosphere.

3. The catcher of claim 1 wherein said clamp comprises:
a) two hinged halves,
b) a swivel bolt,
c) a wing nut, and
d) two locking pads, whereby, manipulation of said wing nut can cause said clamp to be tightened or loosened to attach or detach said catcher from said conduit and whereby, said locking pads provide locking means to said conduit.

4. The catcher of claim 3 wherein said locking pads are appropriately sized to accommodate the size of said conduit.

* * * * *